Feb. 1, 1938.   P. E. FENTON   2,106,728
SEPARABLE FASTENER
Filed Feb. 4, 1936

INVENTOR
Paul E. Fenton,
BY
Fraser, Myers & Manley
ATTORNEYS.

Patented Feb. 1, 1938

2,106,728

UNITED STATES PATENT OFFICE 2,106,728

SEPARABLE FASTENER

Paul E. Fenton, Thomaston, Conn., assignor to Scovill Manufacturing Company, Waterbury, Conn., a corporation of Connecticut Application February 4, 1936, Serial No. 62,242

2 Claims. (Cl. 24—216)

This invention relates to separable snap fasteners of the type commonly used on gloves, pocketbooks, and other similar articles, for the purpose of buttoning one part of the article to another part thereof; and more particularly to an improved socket assembly for such a fastener.

The principal object of the invention is to provide a snap fastener socket assembly comprising a stud-receiving member and an attaching cap member, the latter having a plurality of projecting prongs thereon which are adapted to pass through a piece of sheet material and to be clinched to the stud-receiving member.

Another object of the invention is to provide a stud-receiving element having a forwardly and outwardly curving breast portion which is adapted to engage the prongs of a cap element and to force the pointed ends of the latter outwardly into a clinching relationship with an annular retaining ring whereby the elements may be securely attached one to the other and whereby the fabric or other sheet material will be securely engaged between the elements.

Other objects and various features of the invention will be more apparent from the following description which is to be read in connection with the accompanying drawing in which—

Figure 1:
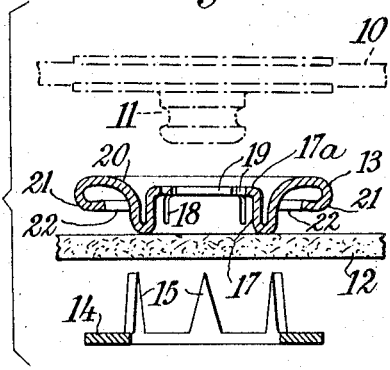
Figure 1 is a cross-sectional view of the elements of the socket assembly of the present invention showing their relationship to a piece of fabric prior to engagement therewith; and showing in dotted lines the stud element of a snap fastener which is adapted to be engaged with the socket assembly.

In the drawing the numeral 10 designates a piece of sheetlike material having a stud portion 11 of a separable snap fastener affixed thereto in any desired manner; and 12 represents a similar piece of sheetlike material which is adapted to carry the socket assembly of the fastener. The latter, as can be seen most particularly in Fig. 1, comprises a stud-receiving element 13 and an attaching cap member 14.

In prior forms of similar socket assemblies the cap member thereof has been provided with a cylindrical wall portion which was adapted to project through a hole in the sheetlike material to engage the socket member. In some instances the necessary hole was cut in the material prior to the attachment of the assembly thereby rigidly defining the position at which the latter could be affixed. In other cases the wall member itself pierced a hole in the material during the attaching operation. Here again, however, it may be said that the hole rigidly defined the location of the assembly for the reason that an improperly placed socket could not be stripped off and relocated without leaving an unsightly hole. Furthermore, with such prior forms of the device the sheetlike material was grasped between the two oppositely disposed members only along the marginal edge of the aforementioned hole. Another, and more obvious, disadvantage of a device which requires such a hole is that the hole materially reduces the strength of the fabric.

The present invention proposes to avoid the foregoing difficulties by providing the cap element 14 with a circular series of spaced prongs 15 which extend forwardly from the flange 16 in a direction which is substantially parallel to the axis of the cap, i. e., substantially at right angles to the flange 16. Thus the prongs will be substantially straight from end to end and all parts thereof will lie between two spaced concentric circles. With such a cap the prongs thereof may pass through the sheetlike material 12 without necessitating the cutting of the hole therein. Accordingly, where the material is a loosely woven fabric, the prongs will merely spread the threads without cutting them; and where the material is leather, or has similar characteristics, the prongs can readily pass therethrough without materially weakening it. Furthermore, this type of cap may be moved from one point on the fabric to another without any very great difficulty. In other words, since there is no hole in the fabric which rigidly defines the position of the assembly, it is possible to strip off an incorrectly placed fastener and to attach another one at the proper point.

The stud-receiving element of the assembly comprises a cylindrical wall 17 having an inwardly rolled front lip 17a which forms a restricted throat at the entrance to the socket. The wall and the front lip, or bead, are notched as at 18 whereby to form a plurality of resilient fingers 19 which are adapted to engage the stud-portion 11 in a well understood manner. The lip at the rear, or other, end of the wall is turned reversely, and flared forwardly and outwardly, to form a gently sloping breast portion 20; and the marginal edge thereof is turned rearwardly and inwardly to form an annular retaining ring 21 which is concentric with the enclosed cylindrical wall 17.

It will be noted that the sloping breast portion is carried outwardly for some considerable distance before it is reversed to form the retaining ring; and that the edge of the latter is terminated well without the immediately opposite portion of the breast whereby to form a relatively wide annular rearwardly facing slot 22. In practice the depth of the breast, i. e., the distance from the front face thereof to the rear end of the wall, should be at least equal to the depth of the cylindrical portion 17, i. e., the distance from the front lip to the rear end thereof; and preferably, as is shown particularly in Figs. 1 and 4, the depth of the breast should exceed the like dimension of the cylindrical portion. If the latter feature is carried out, then the somewhat delicate stud-receiving fingers 19 will lie in a recess, and will be protected by the front wall of the breast. In other words, if, as frequently happens, the article carrying the stud-assembly is dropped and stepped upon, then the front wall of the breast and the cap member will tend to absorb the strain and prevent damage to the stud-engaging fingers.

In assembling the elements of the socket, the stud-receiving member 13 is placed on the front side of the material 12 with the rear end of the cylindrical wall 17 facing the material; and the cap element 14 is disposed on the rear, or other, side with the points of the prongs facing the material. The prongs may then be forced through the material so that they extend forwardly and rest upon the sloping breast portion. Now, by applying pressure to the head of the cap the points of the prongs will be forced, or rolled, outwardly by the sloping breast and into the retaining ring. Further pressure applied to the oppositely disposed members will tend to clinch the retaining ring over the prong points and to grip the material 12 securely between the members.

The assembling of the socket is usually a machine operation rather than a hand one; and the specific operations above detailed tend to merge into a single continuous one. Thus in practice the stud member will be placed upon one element of a suitable press, the cap member upon another element, and the material between the two. Then when the press is tripped the prongs will be driven through the material, turned outwardly by the breast and properly clinched in the retaining ring, all in a single continuous operation. In such an operation it is apparent that the prongs can not first be driven through the material, and then carefully fitted over the breast portion; and consequently, it is highly desirable that some considerable tolerance be permitted between the circle defining the inner edges of the prong points and the circle defining the outer and rear edge of the breast. Such tolerances are possible in the present assembly because of the relatively great width of the breast. In other words, the entrance slot is sufficiently wide to accommodate either slightly undersized or slightly oversized caps, for, as can be seen in the preferred embodiment of Fig. 1, the width of the slot (radial distance between face of breast 20 and innermost edge of ring 21) is at least twice the thickness (radial distance between the concentric defining circles) of any one of the prongs 15.

In this connection it will also be noted that the slope, or curvature, of the breast portion is such as to cause the points of the prongs 15 always to contact the breast at an outwardly sloping part thereof. Consequently, whether the cap be under, or oversized, the prongs will always be forced outwardly when pressure is applied thereto. The importance of this feature will be understood when it is realized that should the prongs strike the breast perpendicularly thereto, then they may tend to turn inwardly, and to buckle, rather than to roll outwardly into the retaining ring. Furthermore, it will be noted that the bending of the prongs is always outwardly and that there is no attempt to reverse the direction. Consequently, again there is substantially no tendency for the prongs to buckle.

Figure 4:
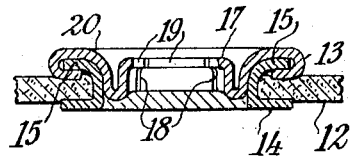
Fig. 4 is a sectional view of the completed assembly embodying the principles of the present invention.
Figure 3:
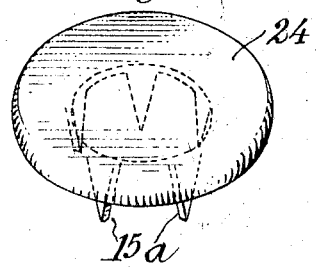
Fig. 3 is a similar view of a modified form of attaching cap.
Figure 2:
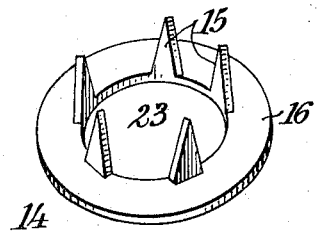
Fig. 2 is a perspective view of one form of attaching cap constituting a part of the socket assembly.

In the cap member of Fig. 2 the head portion, or flange, 16 thereof is provided with a central hole 23 and the front face of the flange may be engraved or otherwise decorated in any desired manner. When such a cap is used in a socket assembly, as can be seen in Fig. 4, a portion of the fabric 12 will be forced upwardly into the hole 23 and will be stretched over the rear edge of the cylindrical wall 17 in such fashion that in effect it becomes a part of the cap member and imparts a very neat, attractive appearance to the front face of the cap. In the cap of Fig. 3, the front face thereof is covered by a dome portion 24, of somewhat standard character, and this dome may be engraved or otherwise decorated in any desired fashion. The rear face of the cap is, however, provided with prongs 15a exactly similar and comparable to the prongs 15 of Fig. 2; and either of these caps may be used indiscriminately with the stud-receiving member 13 to form a complete socket assembly.

Preferably the entire stud-receiving element is struck from a single piece of sheet metal, and the edges thereof are rolled and drawn to form the various parts hereinbefore detailed. Similarly, the cap may, in many cases, be pressed and drawn from sheet metal.

Since certain changes may be made in the invention which are well within the skill of an ordinary mechanic, it is intended that the foregoing shall be construed in a descriptive rather than in a limiting sense.

What I claim is:

1. A one-piece snap fastener socket member comprising a cylindrical wall notched at spaced points along its front lip to form a plurality of somewhat delicate resilient fingers and inwardly rolled along said lip so that each finger has an internal stud-engaging bead, a breast extending from the rear end of the wall outwardly and forwardly for such distance that the front surface of such breast adjacent its outer edge lies at right angles to the wall and forwardly of the lips of each of the fingers, and a retaining ring extending rearwardly and inwardly from the outer edge of the breast and terminating at such point that its inner edge is disposed opposite to and spaced from the rear surface of the breast so as to leave a relatively wide annular entrance slot, the breast throughout that area immediately in front of such entrance slot being curved forwardly and outwardly.

2. A snap fastener socket installation comprising, in combination, a socket member made from a single piece of sheet metal having a substantially cylindrical center wall of only one thickness of metal inturned along its free, front end and notched at spaced points for such distance as to form a plurality of resilient stud-engaging fingers, an annular breast of arcuate cross-section extending outwardly and forwardly from the rear end of the wall for such distance that the outer margin thereof lies in a plane at right angles to and forward of the free ends of such fingers, and a retaining ring of U-shaped cross-section extending rearwardly and inwardly from the edge of the breast and terminating at such point that the inner edge thereof lies opposite and spaced from the curved rear face of the breast; a sheet of supporting material having one face thereof engaging such member at the rear end of the wall; and an attaching element having a radial flange engaging the other face of the material, and a plurality of pointed prongs passing through the material and snugly engaging the breast from the rear end of the wall to the retaining ring so as to provide an additional thickness of metal for backing up the breast, and with its points disposed within the retaining ring and clamped between the opposite faces thereof so as to provide three thicknesses of metal at the outermost edge of the breast.

PAUL E. FENTON.